United States Patent
Ho et al.

(10) Patent No.: US 9,930,250 B2
(45) Date of Patent: Mar. 27, 2018

(54) METHOD AND APPARATUS FOR PERFORMING IMAGE PROCESSING OPERATION BASED ON FRAME/ALGORITHM SELECTION

(71) Applicant: MEDIATEK INC., Hsin-Chu (TW)

(72) Inventors: Cheng-Tsai Ho, Taichung (TW); Ding-Yun Chen, Taipei (TW); Chi-Cheng Ju, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 852 days.

(21) Appl. No.: 14/027,238

(22) Filed: Sep. 15, 2013

(65) Prior Publication Data

US 2015/0077569 A1    Mar. 19, 2015

(51) Int. Cl.
*G06K 9/00* (2006.01)
*H04N 5/20* (2006.01)
*H04N 5/232* (2006.01)

(52) U.S. Cl.
CPC ..... *H04N 5/23219* (2013.01); *G06K 9/00261* (2013.01); *H04N 5/23216* (2013.01); *H04N 5/23241* (2013.01)

(58) Field of Classification Search
None
See application file for complete search history.

(56) References Cited

U.S. PATENT DOCUMENTS

| | | | | |
|---|---|---|---|---|
| 2007/0092143 A1* | 4/2007 | Higgins | ............. | G06K 9/00785 382/228 |
| 2007/0291836 A1* | 12/2007 | Shi | ................. | H04N 21/234381 375/240.01 |
| 2011/0007823 A1* | 1/2011 | Matsuo | ............. | G06K 9/00369 375/240.26 |
| 2012/0293609 A1* | 11/2012 | Doepke | ............. | H04N 5/23238 348/36 |

FOREIGN PATENT DOCUMENTS

| | | |
|---|---|---|
| CN | 1741609 A | 3/2006 |
| CN | 102214298 A | 10/2011 |
| CN | 102509285 A | 6/2012 |
| WO | 2012068485 A1 | 5/2012 |

OTHER PUBLICATIONS

Viola, Robust Real-Time Face Detection, International Journal of Computer Vision 57(2), pp. 137-154, 2004.

* cited by examiner

*Primary Examiner* — Kevin McInnish
(74) *Attorney, Agent, or Firm* — Winston Hsu

(57) ABSTRACT

One image processing method has at least the following steps: receiving an image input in a device, wherein the image input is composed of at least one source image; receiving image selection information; regarding a source image included in the image input, checking the image selection information to determine whether the source image is selected or skipped; and performing an object oriented image processing operation upon each selected source image. Another image processing method has at least the following steps: receiving an image input in a device, wherein the image input is composed of at least one source image; receiving algorithm selection information; and regarding a source image included in the image input, checking the algorithm selection information to determine a selected image processing algorithm from a plurality of different image processing algorithms, and performing an image processing operation upon the source image based on the selected image processing algorithm.

7 Claims, 12 Drawing Sheets

METHOD AND APPARATUS FOR PERFORMING IMAGE PROCESSING OPERATION BASED ON FRAME/ALGORITHM SELECTION

BACKGROUND

The disclosed embodiments of the present invention relate to image processing, and more particularly, to a method and an apparatus for performing an image processing operation based on frame/algorithm selection.

Face detection is a technique used in a variety of applications. For example, a digital camera may employ a face detection function to find face(s) in a preview image. The performance of the face detection may be evaluated in terms of a detection rate and a false positive rate, where the detection rate gives positive results in locations where faces do exist, and the false positive rate gives positive results in locations where no faces exist. A good face detection system should have a high detection rate and a low false positive rate. The convention face detection system processes each input frame for detecting face(s) included therein, and therefore has high computational complexity. When some of the input frames are unreliable due to poor image quality, the conventional face detection system would have bad face detection results, which results in degraded face detection performance (i.e., low detection rate and high false positive rate).

SUMMARY

In accordance with exemplary embodiments of the present invention, a method and an apparatus for performing an image processing operation based on frame/algorithm selection are proposed to solve the aforementioned problem.

According to a first aspect of the present invention, an exemplary image processing method is disclosed. The exemplary image processing method includes at least the following steps: receiving an image input in a device, wherein the image input is composed of at least one source image; receiving image selection information; regarding a source image included in the image input, checking the image selection information to determine whether the source image is selected or skipped; and performing an object oriented image processing operation upon each selected source image.

According to a second aspect, an exemplary image processing method is disclosed. The exemplary image processing method includes at least the following steps: receiving an image input in a device, wherein the image input is composed of at least one source image; receiving algorithm selection information; and regarding a source image included in the image input, checking the algorithm selection information to determine a selected image processing algorithm from a plurality of different image processing algorithms, and performing an image processing operation upon the source image based on the selected image processing algorithm.

According to a third aspect of the present invention, an exemplary image processing apparatus is disclosed. The exemplary image processing apparatus has a frame selection unit and an image processing unit. The frame selection unit is arranged for receiving an image input in a device, wherein the image input is composed of at least one source image; receiving image selection information; and regarding a source image included in the image input, checking the image selection information to determine whether the source image is selected or skipped. The image processing unit is arranged for performing an object oriented image processing operation upon each selected source image.

According to a fourth aspect of the present invention, an exemplary image processing apparatus is disclosed. The exemplary image processing apparatus includes an algorithm selection unit and an image processing unit. The image processing unit is arranged for receiving an image input in a device, wherein the image input is composed of at least one source image; and performing an image processing operation upon a source image based on a selected image processing algorithm. The algorithm selection unit is arranged for receiving algorithm selection information; and regarding the source image included in the image input, checking the algorithm selection information to determine the selected image processing algorithm from a plurality of different image processing algorithms.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
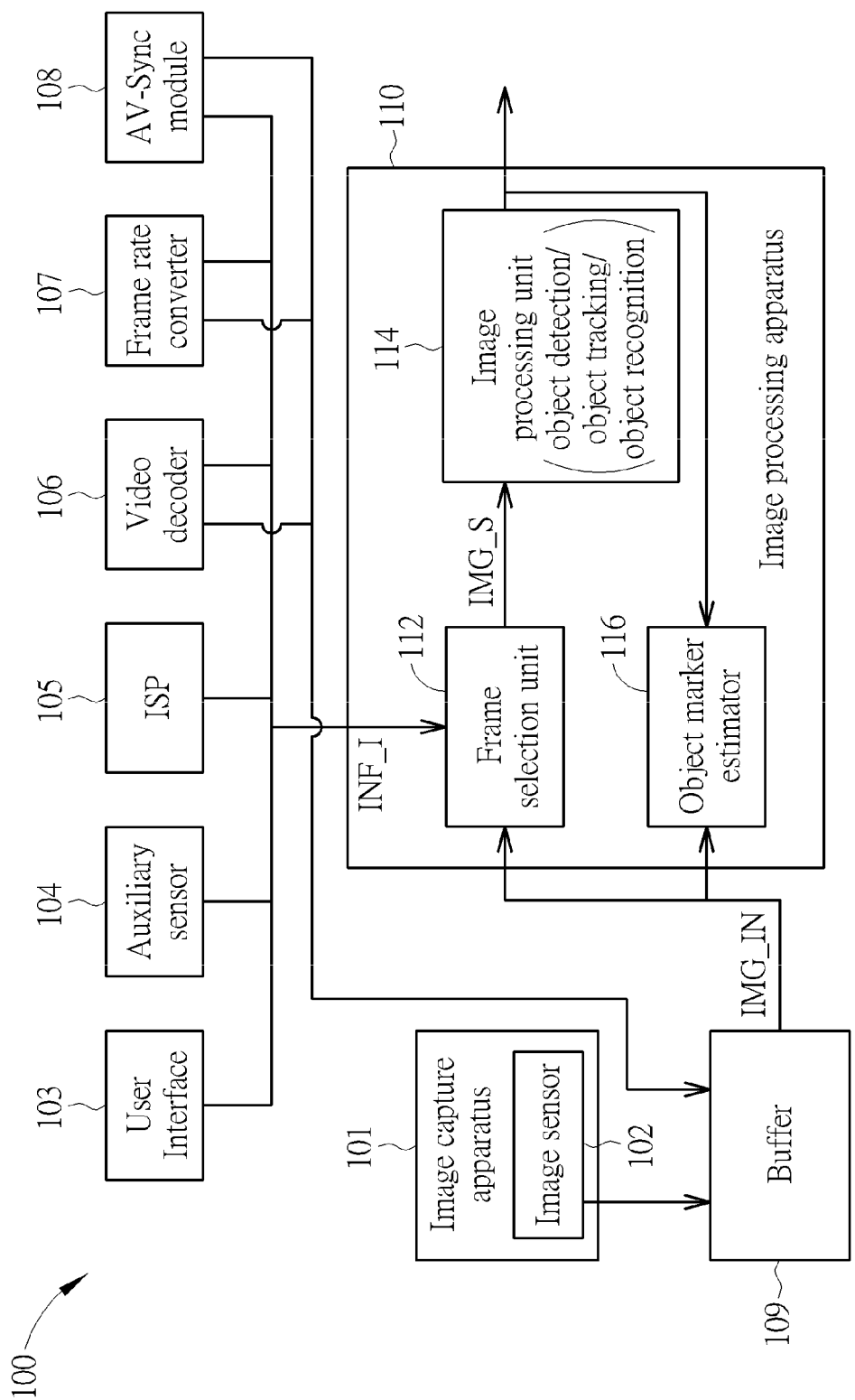
FIG. 1 is a diagram illustrating an image processing apparatus according to an embodiment of the present invention.

FIG. 1 is a diagram illustrating an image processing apparatus according to an embodiment of the present invention. The image processing apparatus 110 may be part of an electronic device 100 such as a digital camera, a smartphone or any device requiring an object detection/object tracking/object recognition function (i.e., object oriented image processing operation). In addition to the image processing apparatus 110, the electronic device 100 has an image capture apparatus 101 with an image sensor 102 included therein, a user interface 103, an least one auxiliary sensor 104, an image signal processor (ISP) 105, a video decoder 106, a frame rate converter 107, an audio/video synchronization (AV-Sync) module 108, and a buffer 109. In this embodiment, the image processing apparatus 110 includes a frame selection unit 112, an image processing unit 114 and an object marker estimator 116. It should be noted that only the elements pertinent to the present invention are shown in FIG. 1. The electronic device 100 is allowed to have additional elements included therein. Besides, based on the actual design requirement/consideration, the electronic device 100 is allowed to omit at least one of the elements shown in FIG. 1.

The frame selection unit 112 receives an image input IMG_IN stored in the buffer 109, where the image input IMG_IN is composed of at least one source image. That is, the image input IMG_IN carries a video content when having a plurality of successive source images, or carries a still image content when having a single source image. In this embodiment, the image input IMG_IN may be an output of at least one of image sensor 102, video decoder 106, frame rate converter 107 and AV-Sync module 108. The frame selection unit 112 further receives image selection information INF_I generated from at least one of user interface 103, auxiliary sensor 104, image signal processor 105, video decoder 106, frame rate converter 107, and AV-Sync module 108. Regarding each source image included in the image input IMG_IN, the frame selection unit 112 checks the image selection information INF_I to determine whether the current source image is selected or skipped. Specifically, when it is determined that the current source image should be selected, the current source image is included in an image output IMG_S generated from the frame selection unit 112; and when it is determined that the current source image should be skipped, the current source image is not included in the image output IMG_S. To put it another way, the frame selection unit 112 serves as an image/frame filter which operates based on the image selection information INF_I.

The image output IMG_S generated from the frame selection unit 112 includes at least one selected source image. The image processing unit 114 receives the image output IMG_S, and performs an object oriented image processing operation upon each selected source image. By way of example, but not limitation, the object oriented image processing operation includes at least one of object detection, object tracking, and object recognition, where the objects detected/tracked/recognized by the object oriented image processing operation may be faces, eyes, man-made objects, etc. As unreliable/redundant source images indicated by the image selection information INF_I are not included in the image output IMG_S, the computational complexity of the image processing unit 114 is relaxed, and/or the accuracy of the object detection/tracking/recognition result is improved. Further details of the image processing apparatus 110 are described as below.

Figure 2:
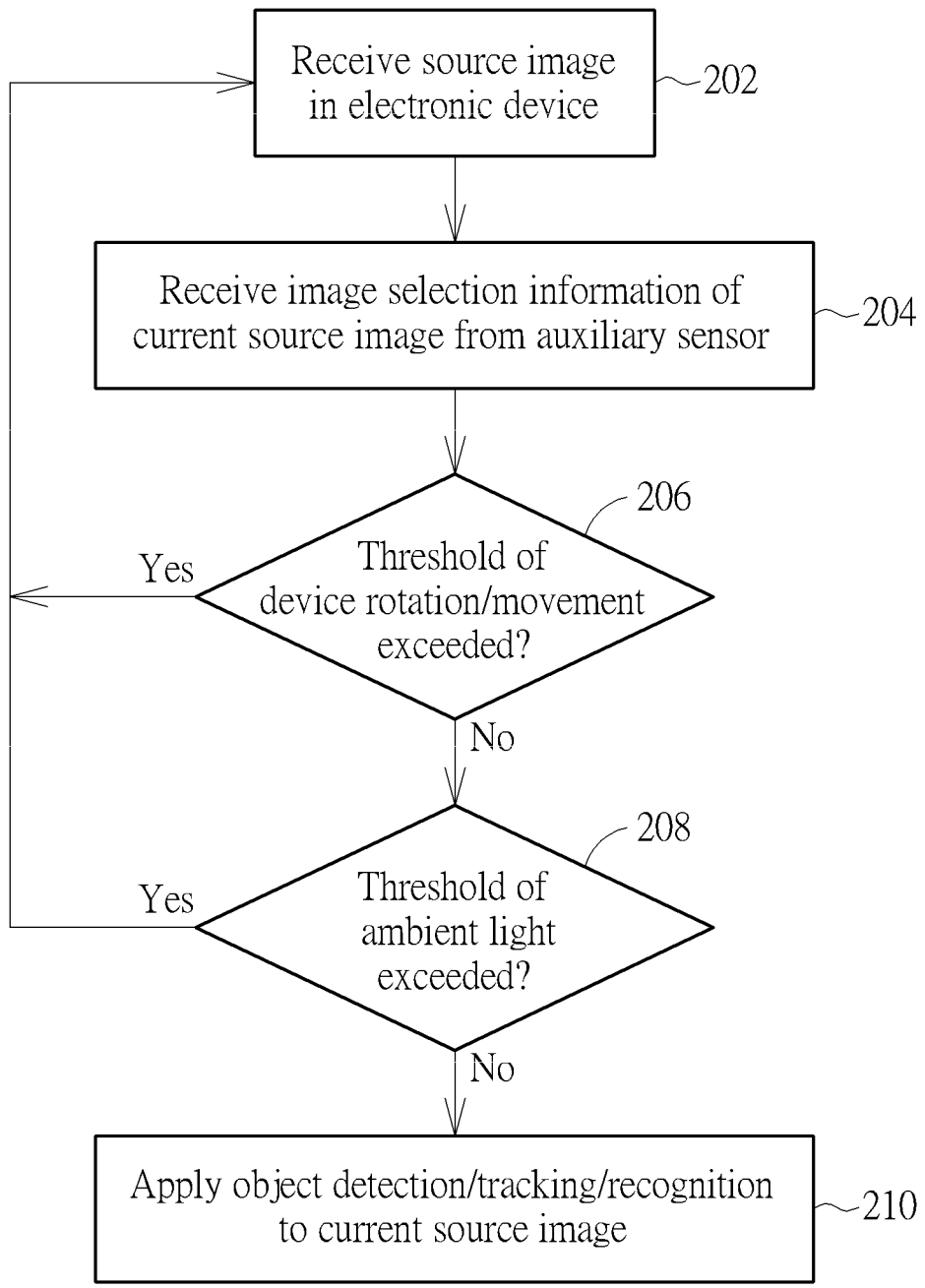
FIG. 2 is a flowchart illustrating an exemplary image processing method based on image selection information generated from an auxiliary sensor.

In one exemplary implementation, the image selection information INF_I may give image quality indication of each source mage included in the image input IMG_IN. For example, the image selection information INF_I may be generated from the auxiliary sensor 104 while the image input IMG_IN is generated by the image capture apparatus 101 with the image sensor 102. Hence, the image selection information INF_I indicates whether a source image is a reliable image or an unreliable image. Please refer to FIG. 2 in conjunction with FIG. 1. FIG. 2 is a flowchart illustrating an exemplary image processing method based on the image selection information INF_I generated from an auxiliary sensor. The frame selection unit 112 checks source images included in the image input IMG_IN one by one. In step 202, the frame selection unit 112 receives a source image in the electronic device 100. In a case where the image selection information INF_I is generated from the auxiliary sensor 104, the auxiliary sensor 104 may be a Gyro sensor or a G-sensor (Accelerometer) which sets the image selection information INF_I according to the related sensor information such as device rotation information or device movement information (i.e., hand shaking information). Thus, in step 204, the frame selection unit 112 receives the image selection information INF_I of the current source image (i.e., sensor information of the current source image) from the auxiliary sensor 104. When the device rotation/movement exceeds a threshold setting TH1, the image selection information INF_I of the current source image would indicate that the current source image generated from the image capture apparatus 101 is an unreliable image. Hence, in step 206, the frame selection unit 112 compares the image selection information INF_I with the threshold setting TH1 to detect whether the device rotation/movement exceeds the threshold setting TH1. When it is determined that the device rotation/movement exceeds the threshold setting TH1, the current source image is skipped without being included in the image output IMG_S supplied to the following image processing unit 114, and the flow proceeds with step 202 to receive the next source image of the image input IMG_IN.

Alternatively, the auxiliary sensor 104 may be a light sensor which sets the image selection information INF_I according to the related sensor information such as detected ambient light. The image selection information INF_I is generated from the auxiliary sensor 104 while the image input IMG_IN is generated by the image capture apparatus 101. When the detected ambient light exceeds a threshold setting TH2 (e.g., the ambient light is too dark due to having a brightness level smaller than a lower bound defined by threshold setting TH2 or the ambient light is too bright due to having the brightness level larger than an upper bound defined by threshold setting TH2), the image selection information INF_I of the current source image would indicate that the current source image generated from the image capture apparatus 101 is an unreliable image. Hence, in step 208, the frame selection unit 112 compares the image selection information INF_I with the threshold setting TH2 to detect whether the detected ambient light exceeds the threshold setting TH2. When it is determined that the detected ambient light exceeds the threshold setting TH2, the current source image is skipped without being included in the image output IMG_S supplied to the following image processing unit 114, and the flow proceeds with step 202 to receive the next source image of the image input IMG_IN.

When the frame selection unit 112 determines that the current source image is not an unreliable image (steps 206 and 208), the current source image is transmitted to the following image processing unit 114. Hence, in step 210, the image processing unit 114 would perform at least one of object detection, object tracking and object recognition upon the current source image.

It should be noted that if the result is substantially the same, the steps are not required to be executed in the exact order shown in FIG. 2. In addition, based on the actual design requirement/consideration, one or more of the steps shown in FIG. 2 may be omitted, and/or additional step(s) may be inserted into the flow shown in FIG. 2.

Figure 3:
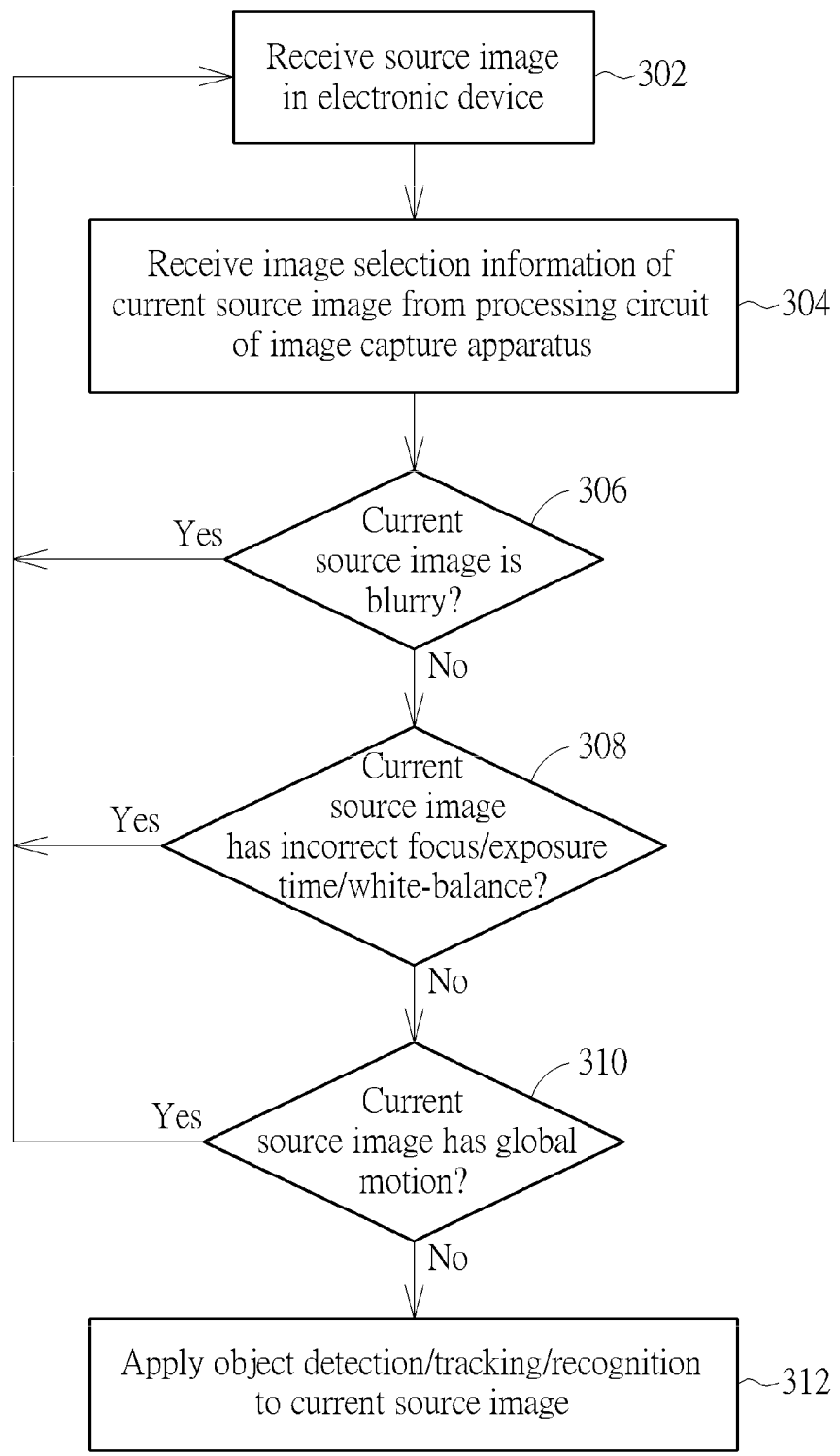
FIG. 3 is a flowchart illustrating an exemplary image processing method based on image selection information generated from a processing circuit of an image capture apparatus.

As mentioned above, the image selection information ING_I may be generated from an element different from the auxiliary sensor 104. Please refer to FIG. 3 in conjunction with FIG. 1. FIG. 3 is a flowchart illustrating an exemplary image processing method based on the image selection information INF_I generated from a processing circuit of an image capture apparatus. The frame selection unit 112 checks source images included in the image input IMG_IN one by one. In step 302, the frame selection unit 112 receives a source image in the electronic device 100. In this embodiment, the image input IMG_IN is generated by the image capture apparatus 101, and the image selection information INF_I is generated from a processing circuit of the image capture apparatus 101 (e.g., image signal processor 105). The image signal processor 105 may obtain blur information (which may be calculated based on any well-known blur estimation algorithm), statistic information of focus, white-balance and exposure time (which may be obtained by a 3A (auto exposure, auto white balance, and auto focus) function), and global motion information (which may come from electronic image stabilization (EIS) processing). Hence, in step 304, the frame selection unit 112 receives the image selection information INF_I of the current source image from the image signal processor 105.

In a first design, the image signal processor 105 sets the image selection information INF_I according to the blur information. When the current source image is blurry, the image selection information INF_I of the current source image would indicate that the current source image generated from the image capture apparatus 101 is an unreliable image. In step 306, the frame selection unit 112 checks the image selection information INF_I to determine if the blur information (e.g., a blur level) of the current source image is larger than a threshold. When it is determined that the blur level of the current source image is larger than the threshold, the frame selection unit 112 regards the current source image as an unreliable image such that the current source image is skipped without being included in the image output IMG_S supplied to the following image processing unit 114. Next, the flow proceeds with step 302 to receive the next source image of the image input IMG_IN.

In a second design, the image signal processor 105 sets the image selection information INF_I according to the statistic information of focus, white-balance and exposure time. When the 3A function does not work properly, the current source image may be de-focused, under-exposed or over-exposed, or may have an incorrect white-balance setting. In this case, the image selection information INF_I of the current source image would indicate that the current source image generated from the image capture apparatus 101 is an unreliable image. In step 308, the frame selection unit 112 checks the image selection information INF_I to determine if the statistic information of focus, white-balance and exposure time shows that the current source image has an incorrect 3A setting. When it is determined that the current source image has incorrect focus, exposure time or white-balance, the frame selection unit 112 regards the current source image as an unreliable image such that the current source image is skipped without being included in the image output IMG_S supplied to the following image processing unit 114. Next, the flow proceeds with step 302 to receive the next source image of the image input IMG_IN.

In a third design, the image signal processor 105 sets the image selection information INF_I according to the global motion information. When the current source image is captured while the electronic device 100 is moving (e.g. due to hand shaking), the image selection information INF_I of the current source image would indicate that the current source image generated from the image capture apparatus 101 is an unreliable image. Hence, in step 310, the frame selection unit 112 checks the image selection information INF_I to determine if the global motion information (i.e., a global motion "hand shaking" level) has a non-zero value. When it is determined that the global motion level has a non-zero value, the frame selection unit 112 regards the current source image as an unreliable image such that the current source image is skipped without being included in the image output IMG_S supplied to the following image processing unit 114. Next, the flow proceeds with step 302 to receive the next source image of the image input IMG_IN.

When the frame selection unit 112 determines that the current source image is not an unreliable image (steps 306, 308 and 310), the current source image is transmitted to the following image processing unit 114. Hence, in step 312, the image processing unit 114 would perform at least one of object detection, object tracking and object recognition upon the current source image.

It should be noted that if the result is substantially the same, the steps are not required to be executed in the exact order shown in FIG. 3. In addition, based on the actual design requirement/consideration, one or more of the steps shown in FIG. 3 may be omitted, and/or additional step(s) may be inserted into the flow shown in FIG. 3.

Figure 4:
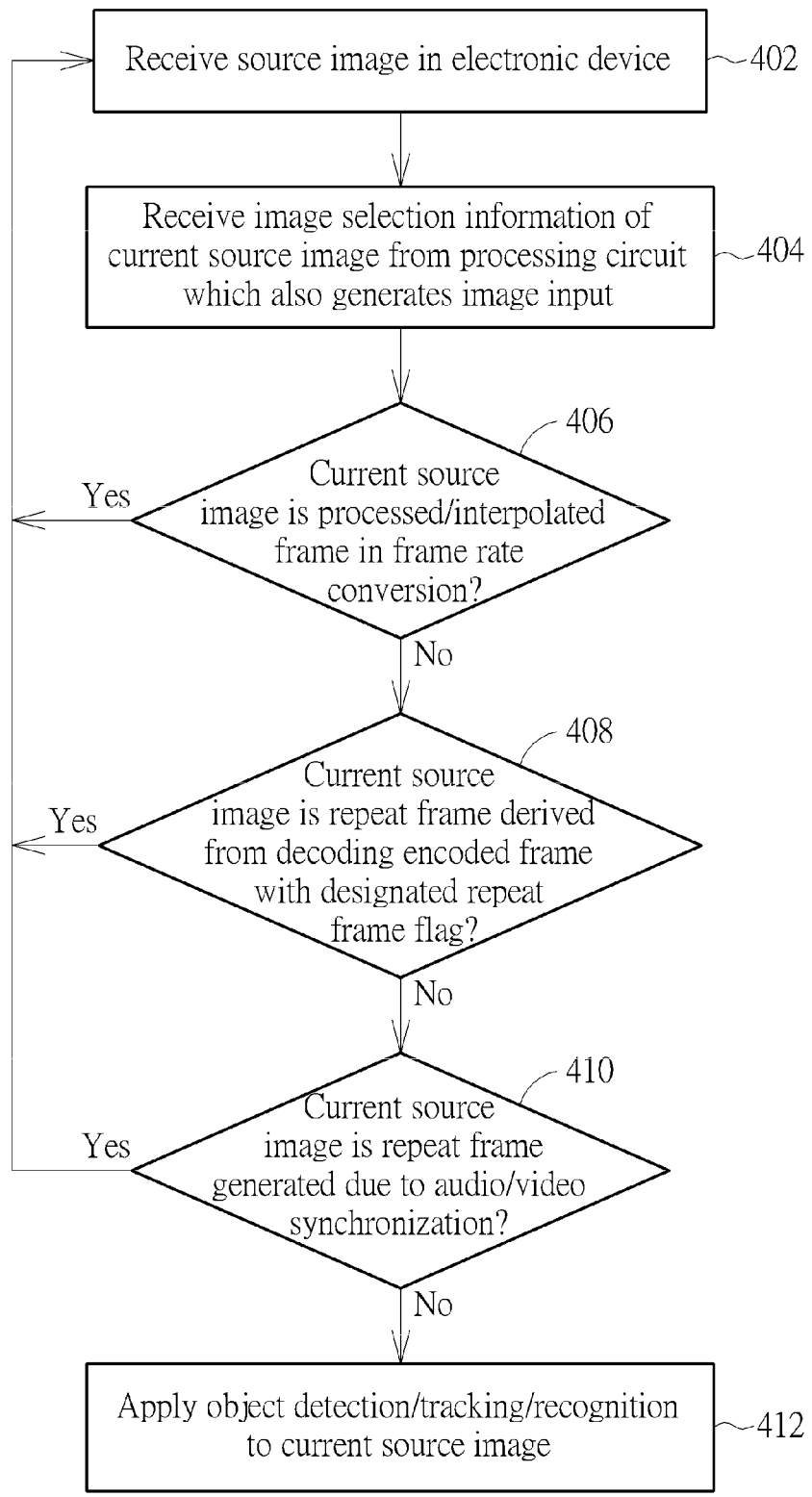
FIG. 4 is a flowchart illustrating an exemplary image processing method based on image selection information generated from a processing circuit which also generates an image input.

Please refer to FIG. 4 in conjunction with FIG. 1. FIG. 4 is a flowchart illustrating an exemplary image processing method based on the image selection information INF_I generated from a processing circuit which also generates an image input. The frame selection unit 112 checks source images included in the image input IMG_IN one by one. In step 402, the frame selection unit 112 receives a source image in the electronic device 100. In this embodiment, the image input IMG_IN is generated by a processing circuit which is one of the video decoder 106, the frame rate converter 107 and the AV-Sync module 108, and the image selection information INF_I is also generated from the processing circuit. In step 404, the frame selection unit 112 receives the image selection information INF_I of the current source image from the processing circuit, where the image selection information INF_I gives frame characteristic information of a source image while the processing circuit generates the source image.

In a first design, the above-mentioned processing circuit is the frame rate converter 107. The frame rate converter 107 may obtain processed/interpolated frame information when performing the frame rate conversion processing, and sets the image selection information INF_I by the obtained processed/interpolated frame information. Supposing the frame rate converter 107 converts an image input with 30 FPS (frames per second) into the image input IMG_IN with 60 FPS, there would be 30 processed/interpolated frames per second. The image selection information INF_I provided by the frame rate converter 107 therefore indicates whether a source image is a processed/interpolated frame. Hence, in step 406, the frame selection unit 112 checks the image selection information INF_I (i.e., processed/interpolated frame information) to determine if the current source image is a processed/interpolated frame. When it is determined that the current source image is a processed/interpolated frame, the frame selection unit 112 regards the current source image as an unreliable image such that the current source image is skipped without being included in the image output IMG_S supplied to the following image processing unit 114. Next, the flow proceeds with step 402 to receive the next source image of the image input IMG_IN.

In a second design, the above-mentioned processing circuit is the video decoder 106. The video decoder 106 is arranged to decode a video bitstream to generate the image input IMG_IN composed of a plurality of successive source images. The video decoder 106 obtains an encoded flag of each encoded frame in a video bitstream when decoding the video bitstream, and sets the image selection information INF_I by the obtained flag information. Supposing the video decoder 106 decodes a 3:2 pull-down video bitstream, the repeat frame flags in the 3:2 pull-down video bitstream would indicate which decoded frames derived from decoding encoded frames with designated repeat frame flags should be repeated. The image selection information INF_I provided by the video decoder 106 therefore indicates whether a source image is a repeat frame generated by duplicating a decoded frame derived from decoding an encoded frame with a designated repeat frame flag. Hence, in step 408, the frame selection unit 112 checks the image selection information INF_I (e.g., repeat frame flag information) to determine if the current source image is a repeat frame. When it is determined that the current source image is a repeat frame, the frame selection unit 112 regards the current source image as an unreliable image such that the current source image is skipped without being included in the image output IMG_S supplied to the following image processing unit 114. Next, the flow proceeds with step 402 to receive the next source image of the image input IMG_IN.

In a third design, the above-mentioned processing circuit is the AV-Sync module 108. The AV-Sync module 108 is arranged to perform an AV-Sync operation to generate the image input IMG_IN such that the video playback of the image input IMG_IN is synchronized with the audio playback of an accompanying audio bitstream. For example, when the video playback of the image input IMG_IN leads the audio playback of the accompanying audio bitstream, the AV-Sync module 108 adds repeat frame(s) to the image input IMG_IN for allowing the audio playback to catch up the video playback, and also sets the image selection information INF_I to indicate which source image(s) in the image input IMG_IN are repeat frame(s). Hence, in step 410, the frame selection unit 112 checks the image selection information INF_I (i.e., repeat frame information) to determine if the current source image is a repeat frame generated due to audio-video synchronization. When it is determined that the current source image is a repeat frame, the frame selection unit 112 regards the current source image as an unreliable image such that the current source image is skipped without being included in the image output IMG_S supplied to the following image processing unit 114. Next, the flow proceeds with step 402 to receive the next source image of the image input IMG_IN.

When the frame selection unit 112 determines that the current source image is not an unreliable image (steps 406, 408 and 410), the current source image is transmitted to the following image processing unit 114. Hence, in step 412, the image processing unit 114 would perform at least one of object detection, object tracking and object recognition upon the current source image.

It should be noted that if the result is substantially the same, the steps are not required to be executed in the exact order shown in FIG. 4. In addition, based on the actual design requirement/consideration, one or more of the steps shown in FIG. 4 may be omitted, and/or additional step(s) may be inserted into the flow shown in FIG. 4.

In above exemplary implementation, the image selection information INF_I is generated automatically without user intervention. Alternatively, the image selection information INF_I may be a user-defined mode setting manually controlled by a user through the user interface 103. More specifically, the user may set the user-defined mode setting manually to enable either a normal mode or a simplified/low-power mode of the frame selection unit 112. When the frame selection unit 112 enters the normal mode in response to the user-defined mode setting, no source image in the image input IMG_IN is filtered out. When the frame selection unit 112 enters the simplified/low-power mode in response to the user-defined mode setting, the frame selection unit 112 is operative to filter out some source images of the image input IMG_IN periodically/non-periodically. For example, if a periodical skip scheme is employed, the frame selection unit 112 may skip N source image(s) per M successive source images, where M and N may be specified by the user-defined mode setting, and N<M. If a non-periodical skip scheme is employed, the frame selection unit 112 may skip source images randomly. When the simplified/low-power mode is selected, the computational complexity (amount) of the image processing unit 114 can be reduced, which may avoid thermal shutdown of the electronic device 100. To put it simply, no matter whether the image selection information INF_I (i.e., user-defined mode setting) instructs the frame selection unit 112 to employ a periodical skip scheme or a non-periodical skip scheme, a source image in the image input IMG_IN is skipped by the frame selection unit 112 when a skip criterion controlled by the image selection information INF_I (i.e., user-defined mode setting) is met.

Figure 5:
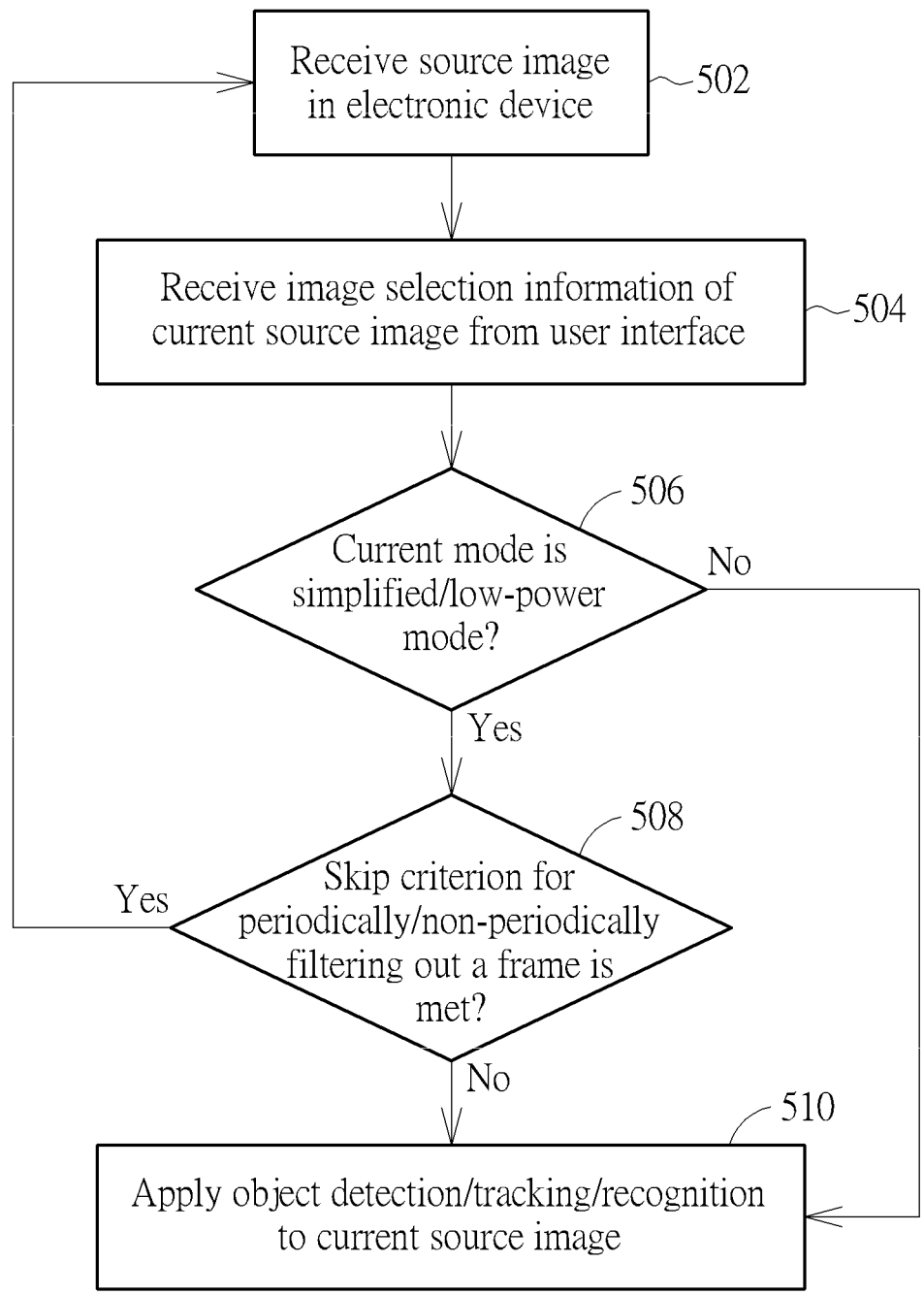
FIG. 5 is a flowchart illustrating an exemplary image processing method based on image selection information generated from a user interface.

Please refer to FIG. 5 in conjunction with FIG. 1. FIG. 5 is a flowchart illustrating an exemplary image processing method based on the image selection information INF_I generated from a user interface. The frame selection unit 112 checks source images included in the image input IMG_IN one by one. In step 502, the frame selection unit 112 receives a source image in the electronic device 100. In this embodiment, the image input IMG_IN is generated by one of image capture apparatus 101, video decoder 106, frame rate converter 107 and AV-Sync module 108, and the image selection information INF_I is generated from the user interface 103. Hence, in step 504, the frame selection unit 112 receives the image selection information INF_I for the current source image, where the image selection information INF_I includes a user-defined mode setting. In step 506, the frame selection unit 112 checks the image selection information INF_I to determine if the current mode is a simplified/low-power mode selected by the user-defined mode setting.

When the current mode is a simplified/low-power mode selected by the user-defined mode setting, the frame selection unit 112 further checks if a skip criterion which is defined for periodically/non-periodically skipping source images is met (step 508). When the skip criterion is met, the frame selection unit 112 regards the current source image as a redundant image such that the current source image is skipped without being included in the image output IMG_S supplied to the following image processing unit 114. Next, the flow proceeds with step 502 to receive the next source image in the image input IMG_IN.

When the frame selection unit 112 determines that the current mode is a normal mode selected by the user-defined mode setting (step 506) or the current source image is not a redundant image (step 508), the current source image is transmitted to the following image processing unit 114. Hence, in step 512, the image processing unit 114 would perform at least one of object detection, object tracking and object recognition upon the current source image.

It should be noted that if the result is substantially the same, the steps are not required to be executed in the exact order shown in FIG. 5. In addition, based on the actual design requirement/consideration, one or more of the steps shown in FIG. 5 may be omitted, and/or additional step(s) may be inserted into the flow shown in FIG. 5.

As mentioned above, the frame selection unit 112 may skip some source images (e.g., unreliable/redundant images) included in the image input IMG_IN. Hence, the unreliable/redundant images are not processed by the image processing unit 114 for object detection/object tracking. Regarding each of the unreliable/redundant images, there is no object marker found in the unreliable/redundant image by the image processing unit 114. However, when the image input IMG_IN in the buffer 109 is displayed on a display screen (not shown), an object marker is required to be shown on the displayed unreliable/redundant image for indicating the position of the detected/tracked object. In this embodiment, the object marker estimator 116 is implemented to determine a display position of an object marker estimated for each unreliable/redundant image that is not processed by the image processing unit 114.

Figure 6:
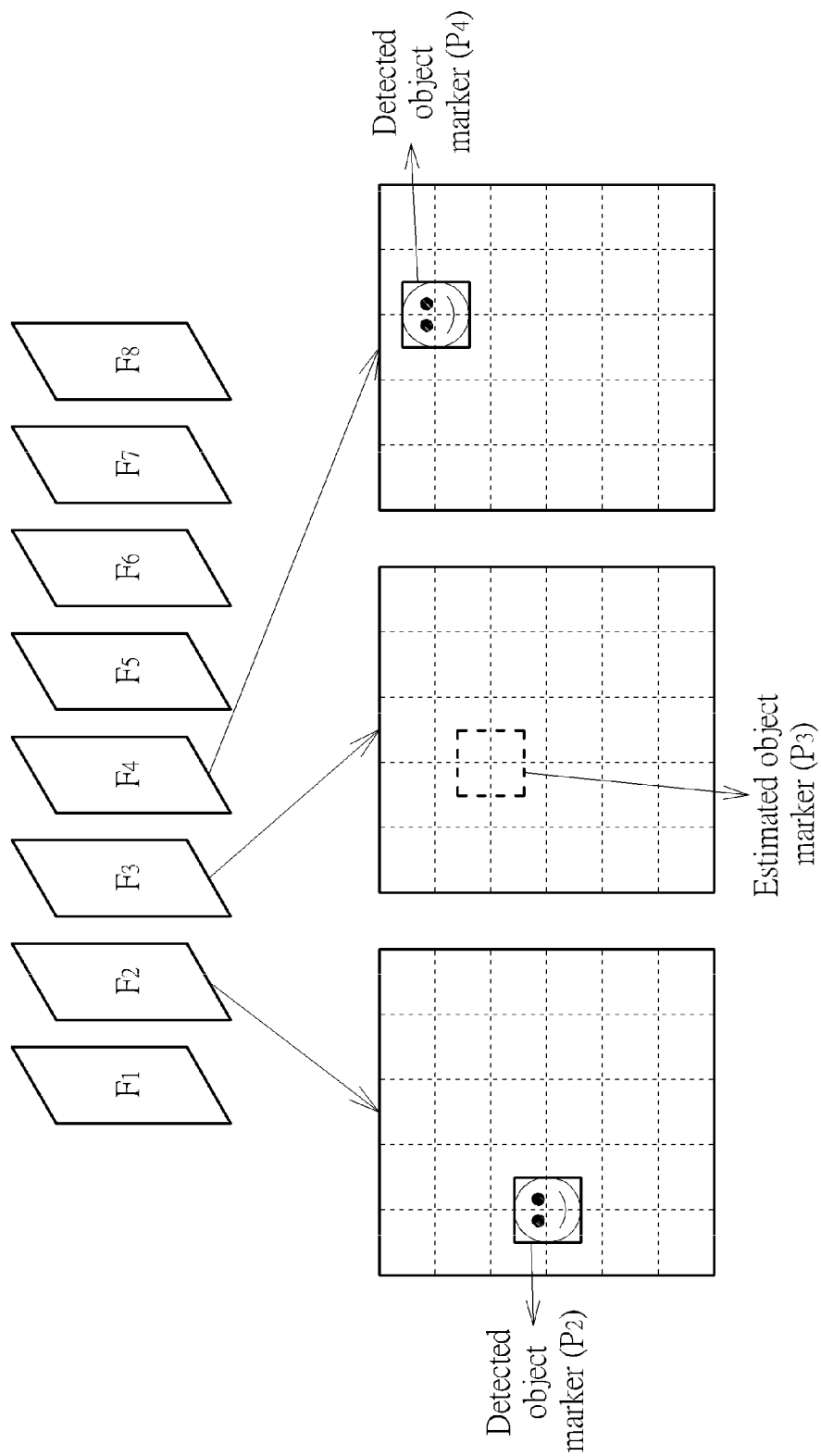
FIG. 6 is a diagram illustrating an example of determining a position of an estimated object marker.

FIG. 6 is a diagram illustrating an example of determining a position of an estimated object marker. As shown in FIG. 6, there are successive source images $F_1$-$F_8$. In this example, source images F2, F4 are selected by the frame selection unit 112, and the source image F3 between the source images F2, F4 is skipped by the frame selection unit 112. The image processing unit 114 processes the source images F2, F4, and obtains detected object markers of an object (e.g., human face) located at display positions P2, P4. The object marker estimator 116 may refer to at least a display position of an object marker of an object processed by the object oriented image processing operation in a selected source image to estimate a display position of an object marker of the object in a skipped source image. For example, the object marker estimator 116 may perform linear/nonlinear interpolation based on one or both of the display positions P2 and P4 to obtain an estimated object market located at a display position $P_3$.

As mentioned above, the image processing apparatus 110 skips unreliable/redundant images to reduce the computational complexity (amount) of the image processing unit 114 and/or improve the accuracy of the object detection/object tracking/object recognition result. In an alternative design, an image processing apparatus is configured to have an image processing unit which switches between different image processing algorithms (e.g., a normal algorithm and a simplified/low-power algorithm). In this way, the computational complexity of the image processing unit can be reduced.

Figure 7:
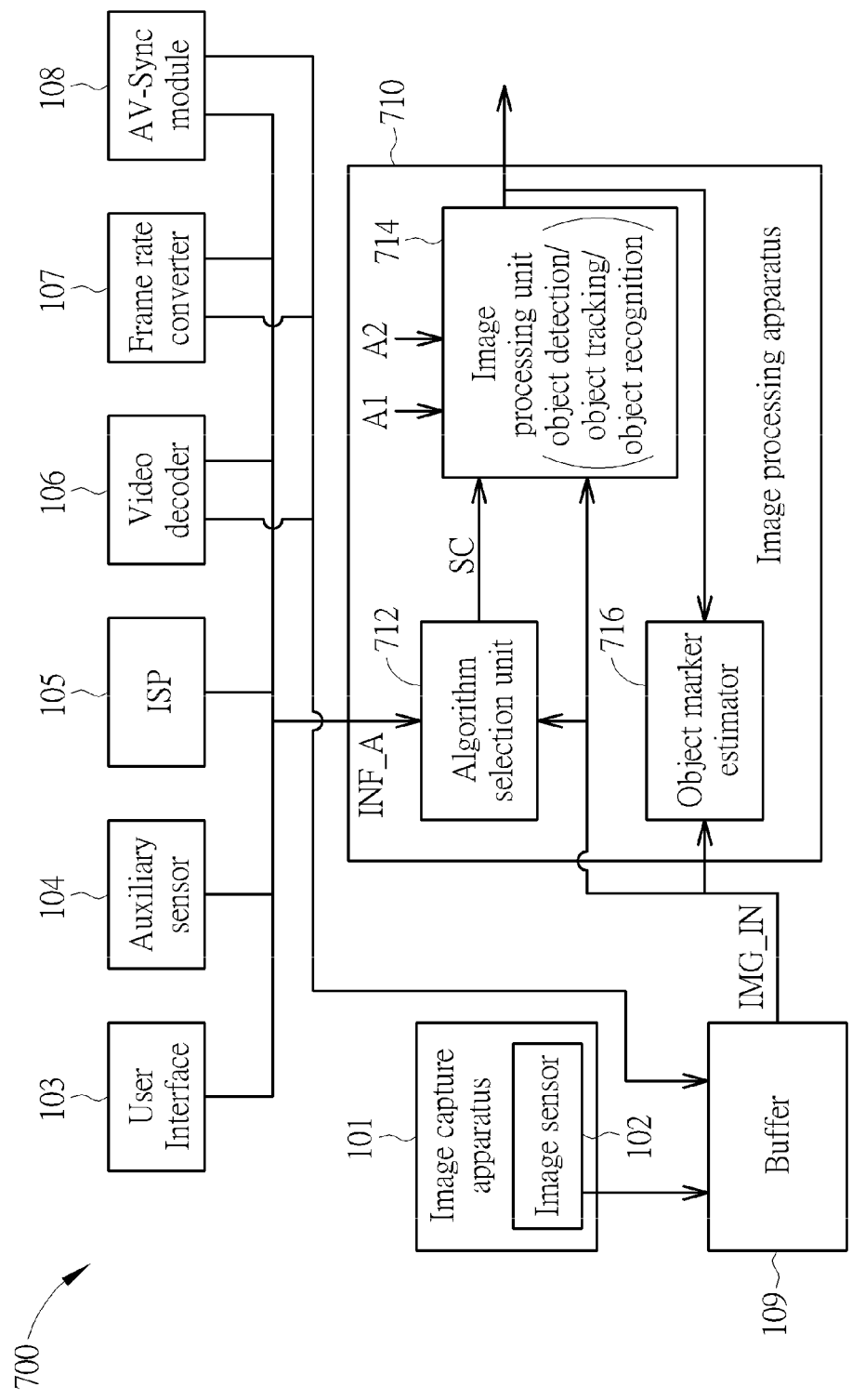
FIG. 7 is a diagram illustrating an image processing apparatus according to another embodiment of the present invention.

FIG. 7 is a diagram illustrating an image processing apparatus according to another embodiment of the present invention. The image processing apparatus 710 may be part of an electronic device 700 such as a digital camera, a smartphone or any device requiring an object detection/object tracking/object recognition function. The major difference between the electronic devices 100 and 700 is the image processing apparatus 710 having an algorithm selection unit 712, an image processing unit 714 and an object marker estimator 716. The algorithm selection unit 712 receives algorithm selection information INF_A generated from at least one of user interface 103, auxiliary sensor 104, image signal processor 105, video decoder 106, frame rate converter 107, and AV-Sync module 108. It should be noted that the algorithm selection information INF_A and the image selection information INF_I may be generated by the same manner. As a person skilled in the art can readily understand details directed to generation of the algorithm selection information INF_A after reading above paragraphs directed to the generation of the image selection information INF_I, further description is omitted here for brevity.

Regarding each source image included in the image input IMG_IN, the algorithm selection unit 712 checks the algorithm selection information INF_A to determine a selected image processing algorithm from a plurality of different image processing algorithms (e.g., a normal algorithm A1 and a simplified/low-power algorithm A2), and sends an algorithm selection signal SC to the image processing unit 714 to enable the selected image processing algorithm. Specifically, when it is determined that the current source image is not a redundant/unreliable image and therefore should be processed using the normal algorithm A1, the algorithm selection signal SC instructs the image processing unit 714 to employ the normal algorithm A1; and when it is determined that the current source image is a redundant/unreliable image and therefore should be processed using the simplified/low-power algorithm A2, the algorithm selection signal SC instructs the image processing unit 714 to employ the simplified/low-power algorithm A2.

The image processing unit 714 receives the image input IMG_IN stored in the buffer 109, where the image input IMG_IN is composed of at least one source image. That is, the image input IMG_IN carries a video content when having a plurality of successive source images, or carries a still image content when having a single source image. In this embodiment, the image input IMG_IN may be an output of at least one of image sensor 102, video decoder 106, frame rate converter 107, and AV-Sync module 108. Regarding each source image included in the image input IMG_IN, the image processing unit 714 performs an image processing operation upon the source image based on the selected image processing algorithm as indicated by the algorithm selection signal SC. By way of example, but not limitation, the image processing operation may be an object oriented image processing operation including at least one of object detection, object tracking, and object recognition. However, this is for illustrative purposes only, and is not meant to be a limitation of the present invention.

The normal algorithm A1 is employed for processing a source image which is not a redundant/unreliable image due to the fact that the algorithm selection unit 712 is configured to determine the selected image processing algorithm to be the normal algorithm A1 when the algorithm selection information INF_A indicates that the source image is not a redundant/unreliable image. The simplified/low-power algorithm A2 is employed for processing a source image which is a redundant/unreliable image due to the fact that the algorithm selection unit 712 is configured to determine the selected image processing algorithm to be the simplified/low-power algorithm A2 when the algorithm selection information INF_A indicates that the source image is a redundant/unreliable image. Compared to the image processing operation performed upon a source image based on the normal algorithm A1, the image processing operation performed upon the same source image based on the simplified/low-power algorithm A2 has a reduced computation/calculation amount or lower power consumption. For example, when the image processing operation performed by the image processing unit 714 is object detection, the simplified/low-power algorithm A2 may be a fast object detection algorithm with a reduced object search window size and/or a reduced number of object search target sizes. Specifically, with regard to the normal object detection algorithm, the image processing unit 714 shifts an object search window by one pixel in each step. However, with regard to the fast object detection algorithm, the image processing unit 714 shifts the object search window by N pixels in each step, where N>1. In addition, with regard to the normal object detection algorithm, the image processing unit 714 may employ four different object search target sizes, sequentially. However, with regard to the fast object detection algorithm, the image processing unit 714 may employ two of the four different object search target sizes, sequentially. It should be noted that, this is for illustrative purposes only, and is not meant to be a limitation of the present invention.

Figure 8:
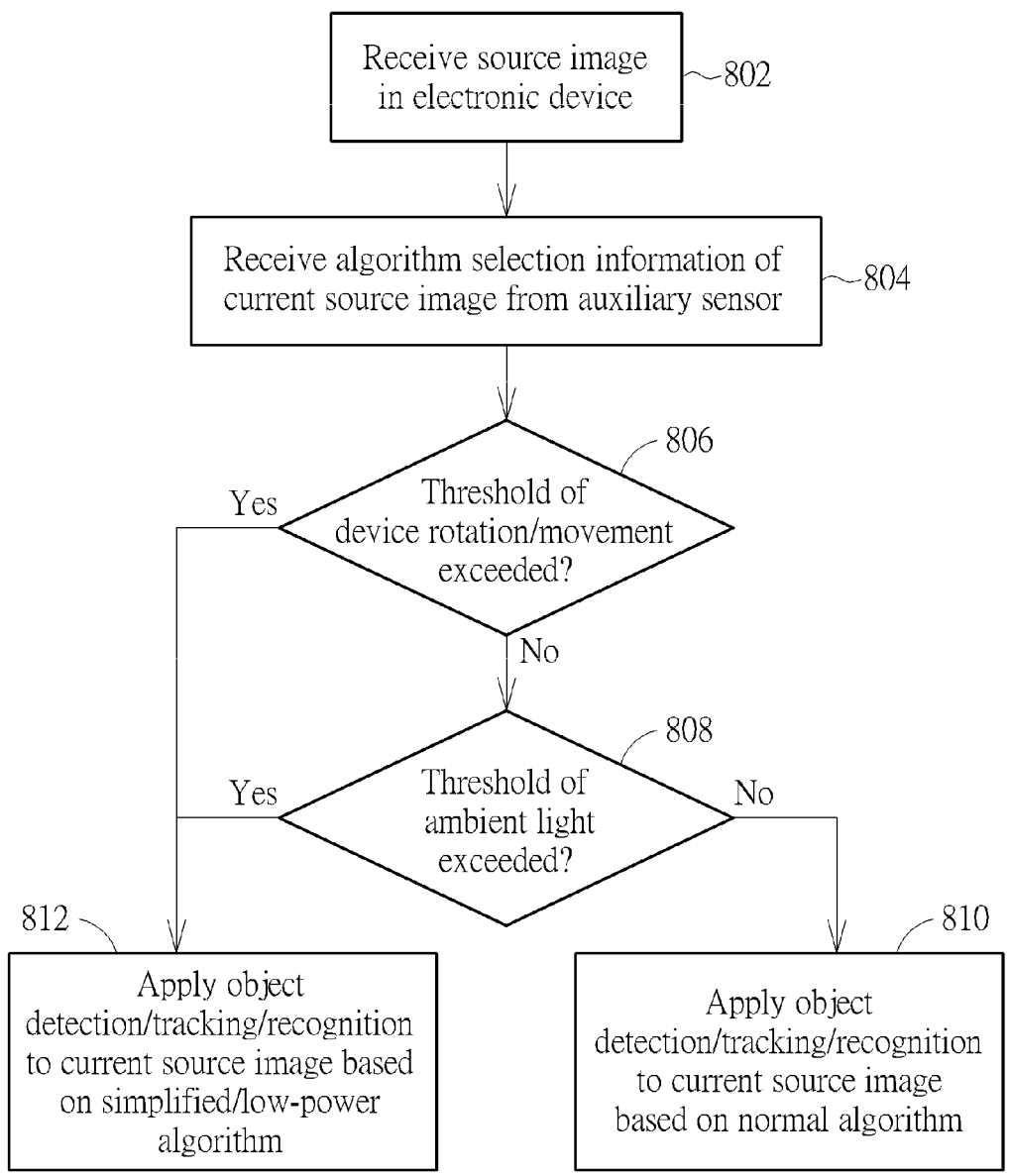
FIG. 8 is a flowchart illustrating an exemplary image processing method based on algorithm selection information generated from an auxiliary sensor.

Please refer to FIG. 8 in conjunction with FIG. 7. FIG. 8 is a flowchart illustrating an exemplary image processing method based on the algorithm selection information INF_A generated from an auxiliary sensor. The image processing unit 714 processes source images included in the image input IMG_IN one by one. In step 802, the image processing unit 714 receives a source image in the electronic device 700. In a case where the algorithm selection information INF_A is generated from the auxiliary sensor 104 while the image input IMG_IN is generated by the image capture apparatus 101, the algorithm selection unit 712 receives the algorithm selection information INF_A of the current source image (i.e., sensor information of the current source image) from the auxiliary sensor 104 (step 804). In step 806, the algorithm selection unit 712 compares the algorithm selection information INF_A with the threshold setting TH1 to detect whether the device rotation/movement exceeds the threshold setting TH1. When it is determined that the device rotation/movement exceeds the threshold setting TH1, the algorithm selection unit 712 generates the algorithm selection signal SC to set the selected image processing algorithm by the simplified/low-power algorithm A2, and the flow proceeds with step 812.

Alternatively, the auxiliary sensor 104 may be a light sensor which sets the algorithm selection information INF_A according to the related sensor information such as detected ambient light. In step 808, the algorithm selection unit 712 compares the algorithm selection information INF_A with the threshold setting TH2 to detect whether the detected ambient light exceeds the threshold setting TH2. When it is determined that the detected ambient light exceeds the threshold setting TH2, the algorithm selection unit 712 generates the algorithm selection signal SC to set the selected image processing algorithm by the simplified/low-power algorithm A2, and the flow proceeds with step 812.

When the algorithm selection unit 712 determines that the current source image is not an unreliable image (steps 806 and 808), the algorithm selection unit 712 generates the algorithm selection signal SC to set the selected image processing algorithm by the normal algorithm A1, and the flow proceeds with step 810.

In step 812, the image processing unit 714 performs at least one of object detection, object tracking and object recognition upon the current source image based on the simplified/low-power algorithm A2. However, in step 810, the image processing unit 714 performs at least one of object detection, object tracking and object recognition upon the current source image based on the normal algorithm A1.

It should be noted that if the result is substantially the same, the steps are not required to be executed in the exact order shown in FIG. 8. In addition, based on the actual design requirement/consideration, one or more of the steps shown in FIG. 8 may be omitted, and/or additional step(s) may be inserted into the flow shown in FIG. 8.

Figure 9:
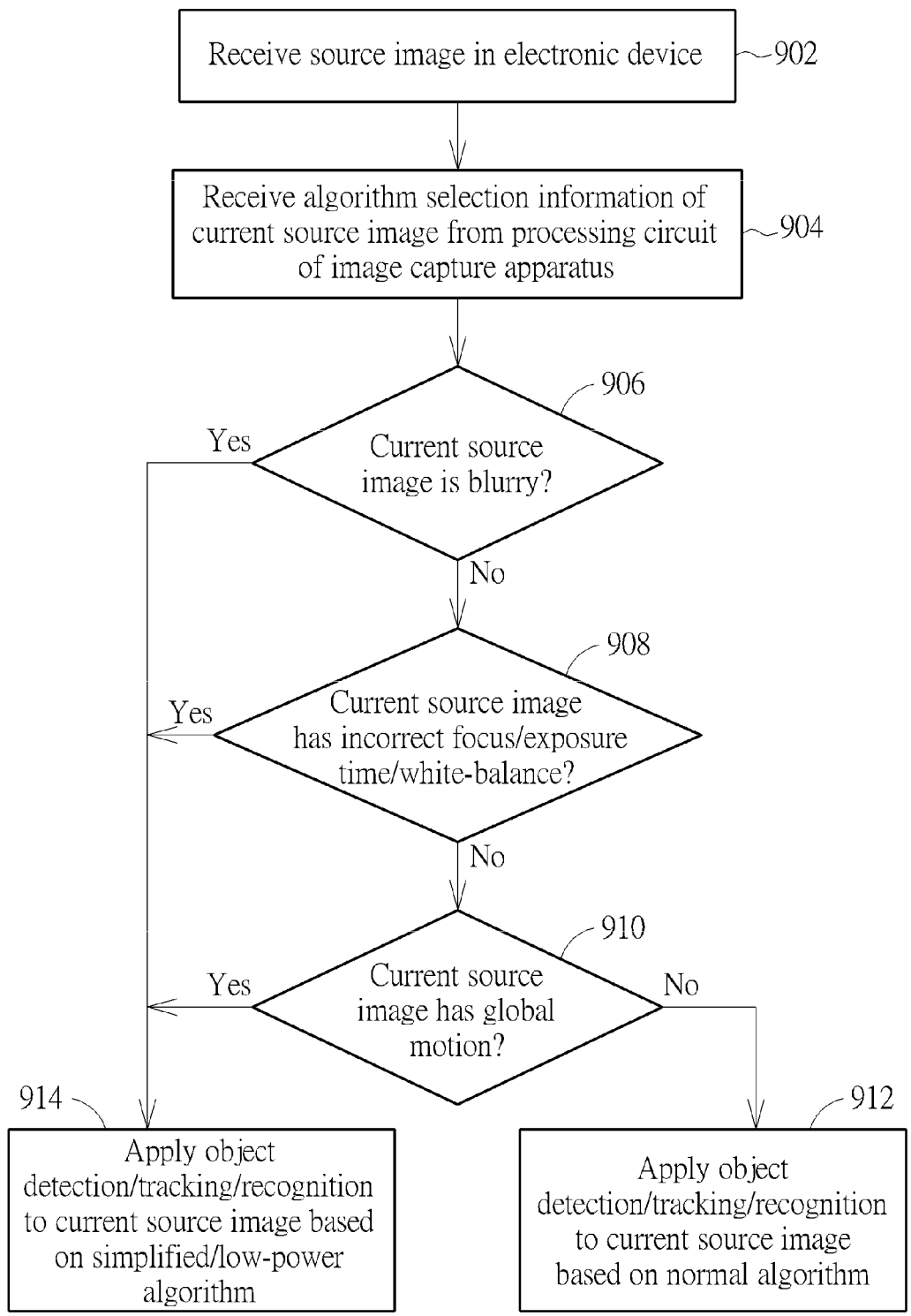
FIG. 9 is a flowchart illustrating an exemplary image processing method based on algorithm selection information generated from a processing circuit of an image capture apparatus.

Please refer to FIG. 9 in conjunction with FIG. 7. FIG. 9 is a flowchart illustrating an exemplary image processing method based on the algorithm selection information INF_A generated from a processing circuit of an image capture apparatus. The image processing unit 714 processes source images included in the image input IMG_IN one by one. In step 902, the image processing unit 714 receives a source image in the electronic device 700. In this embodiment, the image input IMG_IN is generated by the image capture apparatus 101, and the algorithm selection information INF_A is generated from a processing circuit of the image capture apparatus 101 (e.g., image signal processor 105). In step 904, the algorithm selection unit 712 receives the algorithm selection information INF_A of the current source image from the image signal processor 105.

In a first design, the image signal processor 105 sets the algorithm selection information INF_A according to the blur information. In step 906, the algorithm selection unit 712 checks the algorithm selection information INF_A to determine if the blur information (e.g., a blur level) of the current source image is larger than a threshold. When it is determined that the blur level of the current source image is larger than the threshold, the algorithm selection unit 712 generates the algorithm selection signal SC to set the selected image processing algorithm by the simplified/low-power algorithm A2, and the flow proceeds with step 914.

In a second design, the image signal processor 105 sets the algorithm selection information INF_A according to the statistic information of focus, white-balance and exposure time. In step 908, the algorithm selection unit 712 checks the algorithm selection information INF_A to determine if the statistic information of focus, white-balance and exposure time shows that the current source image has an incorrect 3A setting. When it is determined that the current source image has incorrect focus, exposure time or white-balance, the algorithm selection unit 712 generates the algorithm selection signal SC to set the selected image processing algorithm by the simplified/low-power algorithm A2, and the flow proceeds with step 914.

In a third design, the image signal processor 105 sets the algorithm selection information INF_A according to the global motion information. In step 910, the algorithm selection unit 712 checks the algorithm selection information INF_A to determine if the global motion information (i.e., a global motion level) has a non-zero value. When it is determined that the global motion level has a non-zero value, the algorithm selection unit 712 generates the algorithm selection signal SC to set the selected image processing algorithm by the simplified/low-power algorithm A2, and the flow proceeds with step 914.

When the algorithm selection unit 712 determines that the current source image is not an unreliable image (steps 906, 908 and 910), the algorithm selection unit 712 generates the algorithm selection signal SC to set the selected image processing algorithm by the normal algorithm A1, and the flow proceeds with step 912.

In step 914, the image processing unit 714 performs at least one of object detection, object tracking and object recognition upon the current source image based on the simplified/low-power algorithm A2. However, in step 912, the image processing unit 714 performs at least one of object detection, object tracking and object recognition upon the current source image based on the normal algorithm A1.

It should be noted that if the result is substantially the same, the steps are not required to be executed in the exact order shown in FIG. 9. In addition, based on the actual design requirement/consideration, one or more of the steps shown in FIG. 9 may be omitted, and/or additional step(s) may be inserted into the flow shown in FIG. 9.

Figure 10:
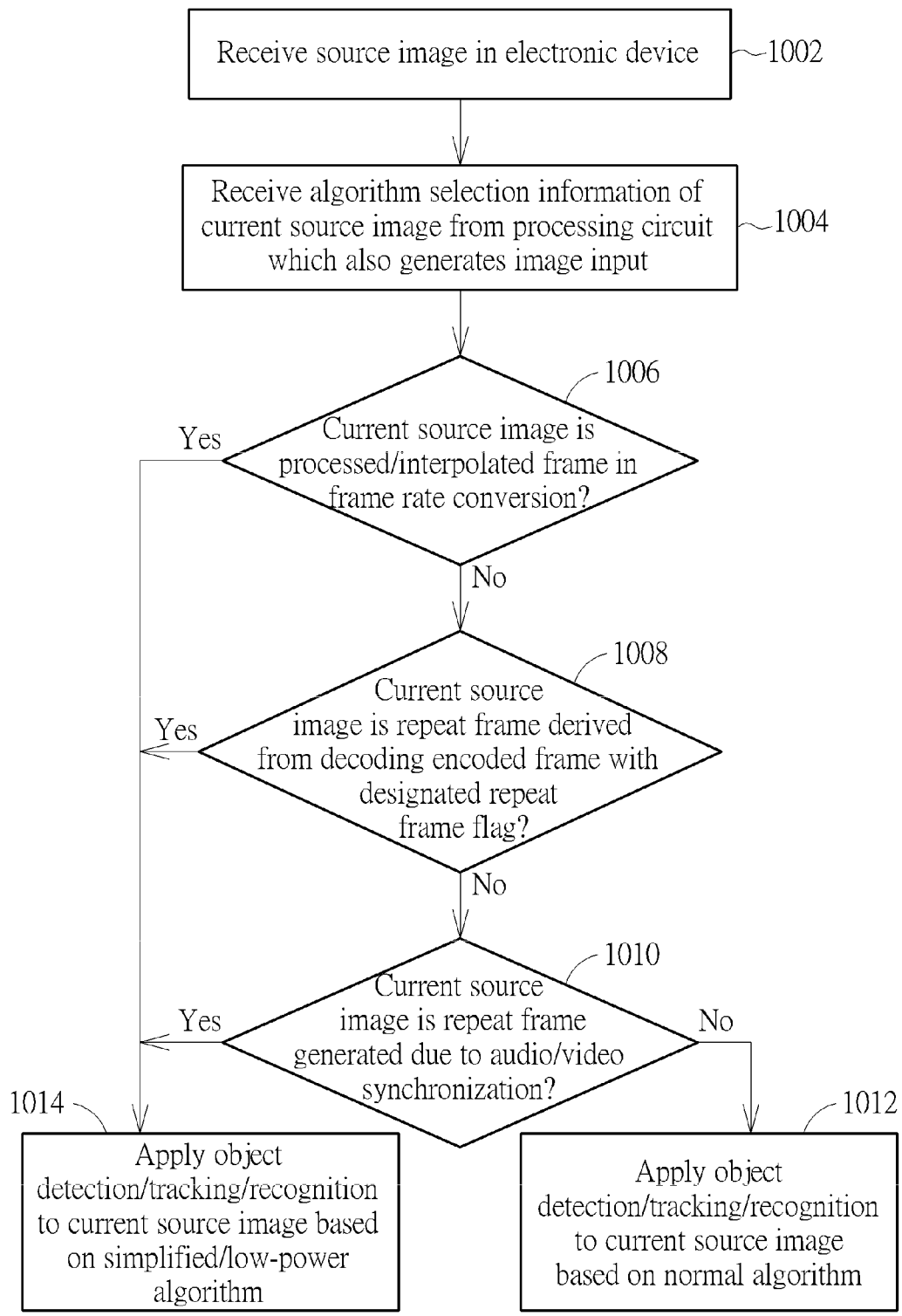
FIG. 10 is a flowchart illustrating an exemplary image processing method based on algorithm selection information generated from a processing circuit which also generates an image input.

Please refer to FIG. 10 in conjunction with FIG. 7. FIG. 10 is a flowchart illustrating an exemplary image processing method based on the algorithm selection information INF_A generated from a processing circuit which also generates an image input. The image processing unit 714 processes source images included in the image input IMG_IN one by one. In step 1002, the image processing unit 714 receives a source image in the electronic device 700. In this embodiment, the image input IMG_IN is generated by a processing circuit which is one of the video decoder 106, the frame rate converter 107 and the AV-Sync module 108, and the algorithm selection information INF_A is generated from the processing circuit. In step 1004, the algorithm selection unit 712 receives the algorithm selection information INF_A of the current source image from the processing circuit.

In a first design, the above-mentioned processing circuit is the frame rate converter 107. In step 1006, the algorithm selection unit 712 checks the algorithm selection information INF_A (i.e., processed/interpolated frame information) to determine if the current source image is a processed/interpolated frame. When it is determined that the current source image is a processed/interpolated frame, the algorithm selection unit 712 generates the algorithm selection signal SC to set the selected image processing algorithm by the simplified/low-power algorithm A2, and the flow proceeds with step 1014.

In a second design, the above-mentioned processing circuit is the video decoder 106. In step 1008, the algorithm selection unit 712 checks the algorithm selection information INF_A (e.g., repeat frame flag information) to determine if the current source image is a repeat frame. When it is determined that the current source image is a repeat frame, the algorithm selection unit 712 generates the algorithm selection signal SC to set the selected image processing algorithm by the simplified/low-power algorithm A2, and the flow proceeds with step 1014.

In a third design, the above-mentioned processing circuit is the AV-Sync module 108. In step 1010, the algorithm selection unit 712 checks the algorithm selection information INF_A (i.e., repeat frame information) to determine if the current source image is a repeat frame generated due to audio-video synchronization. When it is determined that the current source image is a repeat frame, the algorithm selection unit 712 generates the algorithm selection signal SC to set the selected image processing algorithm by the simplified/low-power algorithm A2, and the flow proceeds with step 1014.

When the algorithm selection unit 712 determines that the current source image is not an unreliable image (steps 1006, 1008 and 1010), the algorithm selection unit 712 generates the algorithm selection signal SC to set the selected image processing algorithm by the normal algorithm A1, and the flow proceeds with step 1012.

In step 1014, the image processing unit 714 performs at least one of object detection, object tracking and object recognition upon the current source image based on the simplified/low-power algorithm A2. However, in step 1012, the image processing unit 714 performs at least one of object detection, object tracking and object recognition upon the current source image based on the normal algorithm A1.

It should be noted that if the result is substantially the same, the steps are not required to be executed in the exact order shown in FIG. 10. In addition, based on the actual design requirement/consideration, one or more of the steps shown in FIG. 10 may be omitted, and/or additional step(s) may be inserted into the flow shown in FIG. 10.

Figure 11:
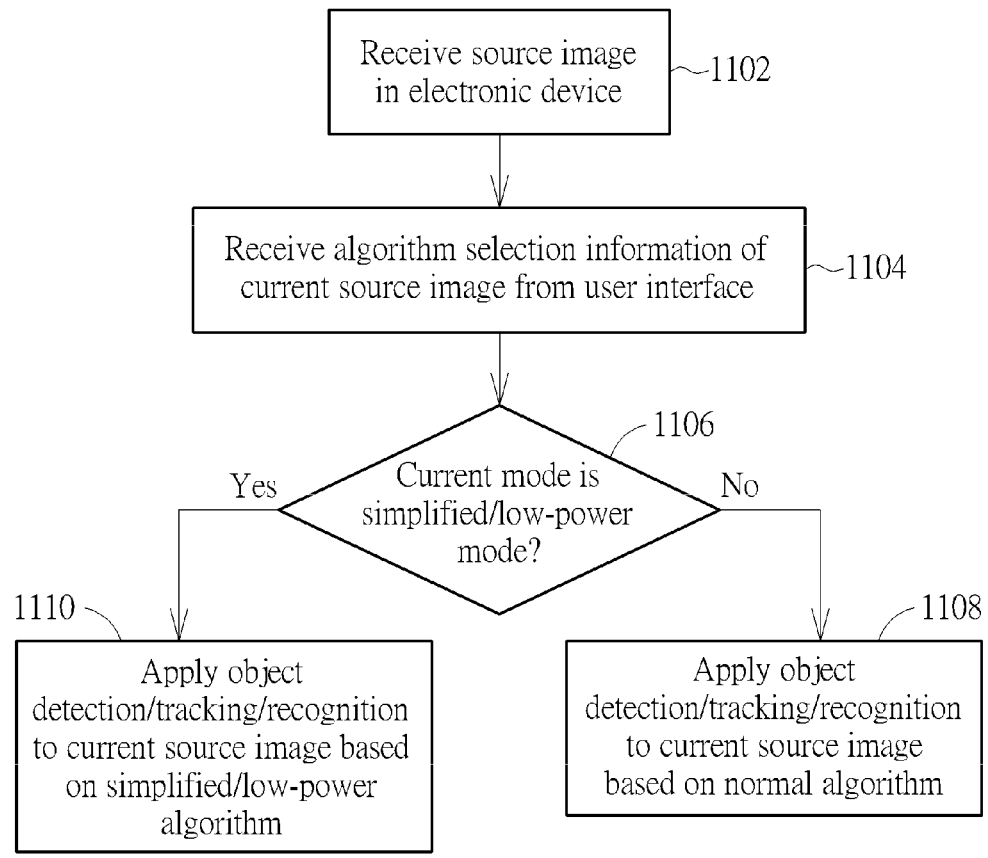
FIG. 11 is a flowchart illustrating an exemplary image processing method based on algorithm selection information generated from a user interface.

Please refer to FIG. 11 in conjunction with FIG. 7. FIG. 11 is a flowchart illustrating an exemplary image processing method based on the algorithm selection information INF_A generated from a user interface. The image processing unit 714 checks source images included in the image input IMG_IN one by one. In step 1102, the image processing unit 714 receives a source image in the electronic device 100. In this embodiment, the image input IMG_IN is generated by one of image capture apparatus 101, video decoder 106, frame rate converter 107, and AV-Sync module 108, and the algorithm selection information INF_A is generated from the user interface 103. Hence, in step 1104, the algorithm selection unit 712 receives the algorithm selection information INF_A for the current source image, where the algorithm selection information INF_A includes a user-defined mode setting. In step 1106, the algorithm selection unit 712 checks the algorithm selection information INF_A to determine if the current mode is a simplified/low-power mode selected by the user-defined mode setting. When the current mode is a simplified/low-power mode selected by the user-defined mode setting, the algorithm selection unit 712 generates the algorithm selection signal SC to set the selected image processing algorithm by the simplified/low-power algorithm A2, and the flow proceeds with step 1110. When the current mode is a normal mode selected by the user-defined mode setting, the algorithm selection unit 712 generates the algorithm selection signal SC to set the selected image processing algorithm by the normal algorithm A1, and the flow proceeds with step 1108.

In step 1110, the image processing unit 714 performs at least one of object detection, object tracking and object recognition upon the current source image based on the simplified/low-power algorithm A2. However, in step 1108, the image processing unit 714 performs at least one of object detection, object tracking and object recognition upon the current source image based on the normal algorithm A1.

It should be noted that if the result is substantially the same, the steps are not required to be executed in the exact order shown in FIG. 11. In addition, based on the actual design requirement/consideration, one or more of the steps shown in FIG. 11 may be omitted, and/or additional step(s) may be inserted into the flow shown in FIG. 11.

As mentioned above, the image processing unit 714 may employ a simplified/low-power algorithm A2 to process a redundant/unreliable image. However, the display position of the object marker found for the redundant/unreliable image may be inaccurate. In this embodiment, the object marker estimator 716 is implemented to refine the display position of the object marker found for the redundant/unreliable image.

Figure 12:
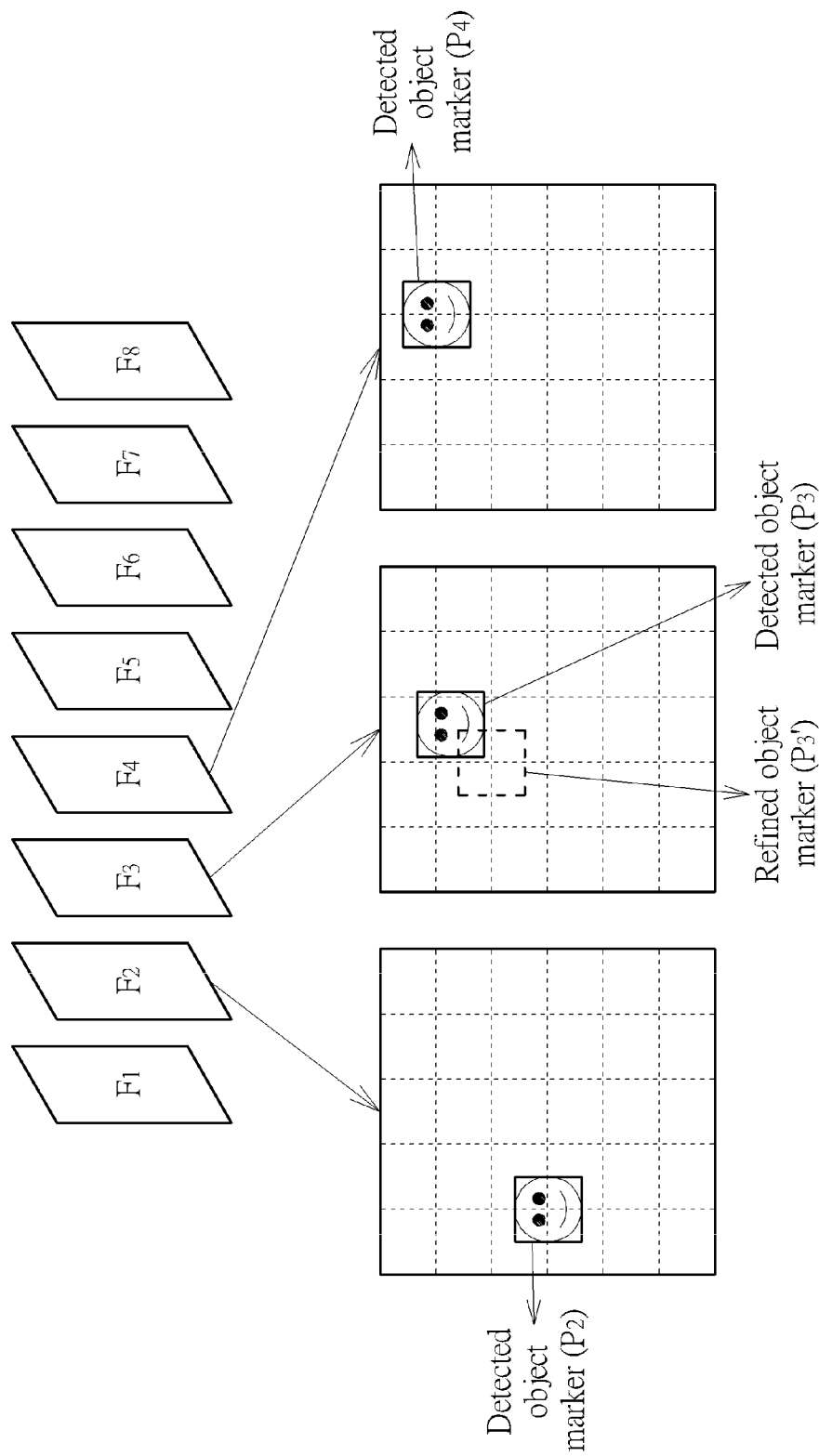
FIG. 12 is a diagram illustrating an example of refining a position of a detected object marker.

FIG. 12 is a diagram illustrating an example of refining a position of a detected object marker. As shown in FIG. 12, there are successive source images $F_1$-$F_8$. In this example, source images F2, F4 are processed using the normal algorithm A1, and the source image F3 between the source images F2, F4 is processed using the simplified/low-power algorithm A2. The image processing unit 114 processes the source images F2-F4, and obtains detected object markers of an object (e.g., human face) located at display positions P2, P3, P4. The object marker estimator 716 may refer to at least a display position of an object marker of an object processed by the image processing operation in a first source image to refine a display position of an object marker of the object processed by the image processing operation in a second source image, where the first source image and the second source image are processed by the image processing operation based on different selected processing algorithms (e.g., the normal algorithm A1 and the simplified/low-power algorithm A2) respectively. For example, the object marker estimator 716 may refine the display position of the detected object marker according to linear/nonlinear interpolation based on one or both of the display positions P2 and P4 to thereby obtain a refined object market located at a display position $P_3'$.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
  receiving an image input in a device, wherein the image input is composed of at least one source image;
  receiving image selection information corresponding to each individual source image in the image input;
  regarding each source image included in the image input, checking the corresponding image selection information to determine whether the source image is selected or skipped for an object oriented image processing operation only;
  when the source image is determined to be skipped according to the image selection information, not performing the object oriented image processing operation on the skipped source image; and
  when the source image is determined to be selected according to the image selection information, performing the object oriented image processing operation including at least one of object detection, object tracking, and object recognition upon each selected source image;
  wherein the image selection information indicates an image quality of each individual source image and is generated according to one of a comparison between gyro sensor information of the device and a threshold, ambient light information and a threshold, blur information of each source image, information indicating whether each source image is a processed or interpolated frame, information indicating whether each source image is a repeat frame, or information indicating whether a current mode of the device is a simplified or low-power mode.

2. The image processing method of claim 1, wherein the image selection information is generated from a motion sensor while the image input is generated by an image capture apparatus with an image sensor.

3. The image processing method of claim 1, wherein the image input is generated by an image capture apparatus, and the image selection information is generated from a processing circuit of the image capture apparatus.

4. The image processing method of claim 1, wherein the image input and the image selection information are both generated from a processing circuit, and the processing circuit is one of a video decoder, a frame rate converter, and an audio/video synchronization (AV-Sync) module.

5. The image processing method of claim 1, wherein the image selection information is a user-defined mode setting.

6. The image processing method of claim 1, further comprising:
  referring to at least a display position of an object marker of an object processed by the object oriented image processing operation in a selected source image to estimate a display position of an object marker of the object in a skipped source image.

7. An image processing apparatus, comprising:
  a frame selection circuit, arranged for receiving an image input in a device, wherein the image input is composed of at least one source image;
  receiving image selection information corresponding to each individual source image in the image input; and
  regarding each source image included in the image input, checking the corresponding image selection information to determine whether the source image is selected or skipped for an object oriented image processing operation only; and
  an image processing circuit, arranged for performing the object oriented image processing operation including at least one of object detection, object tracking, and object recognition upon each selected source image;
  wherein when a source image is determined to be skipped according to the image selection information, not performing the image processing operation upon the skipped source images; and
  wherein the image selection information indicates an image quality of each individual source image and is generated according to one of a comparison between gyro sensor information of the device and a threshold, ambient light information and a threshold, blur information of each source image, information indicating whether each source image is a processed or interpolated frame, information indicating whether each source image is a repeat frame, or information indicating whether a current mode of the device is a simplified or low-power mode.

* * * * *